United States Patent Office 3,548,034
Patented Dec. 15, 1970

3,548,034
POLYMERIZATION OF VINYL CHLORIDE IN THE PRESENCE OF AN ACRYLIC ESTER POLYMER
Johann Cleemann, Bad Vilbel, and Gunther Meyer, Oberlar, Germany, assignors to Dynamit Nobel Aktiengesellschaft, a corporation of Germany
No Drawing. Filed June 27, 1967, Ser. No. 649,138
Claims priority, application Germany, June 30, 1966,
D 50,439
Int. Cl. C08f 15/28
U.S. Cl. 260—884  7 Claims

ABSTRACT OF THE DISCLOSURE

A method of manufacturing polymers on a basis of polyvinyl chloride is disclosed, the same being adapted to being worked with suitable additives, i.e., lubricants and stabilizers, for use as food packaging materials. According to the disclosure vinyl chloride is polymerized (suspension polymerization) in the presence of an emulsion of a polyacrylic ester or an acrylic ester copolymer composed of at least two different acrylic ester units or of a polyacrylic ester mixture having a solid content of 0.1 to 2 weight percent referred to the monomer material and a conventional monomer soluble catalyst at a temperature of from 50 to 80° C. and during the polymerization, either the temperature is adjusted until the pressure drops or the temperature is adjusted by 2 to 30° C. after 20 to 80% of the monomer material has been converted.

---

This invention relates to polymers on a basis of polyvinyl chloride. More particularly, it relates to the manufacture of polymers on a basis of polyvinyl chloride which can be worked following incorporation of certain additives to form transparent sheets, foils and films suitable for use in the packaging of foods.

It is known that polyvinyl chloride manufactured by the suspension polymerization method can be worked in the solid state following the incorporation of certain additives into sheet materials suitable for use in packaging materials for foods. These additives include anti-sticking agents, lubricants and the like, which prevent the material from sticking to the calender rolls during processing. Such sticking occurs particularly when the roll temperatures employed are relatively high. High roll temperatures are required and necessary in order to achieve satisfactory transparency in the product. The obvious thing would appear to be to eliminate these difficulties by adding larger quantities of the additives. This is impossible, however, because the transparency of the material is also adversely affected by large amounts of the additives.

In German Green Pat. 1,206,589 there is disclosed a method for manufacturing a high-impact-strength polyvinyl chloride which comprises polymerizing vinyl chloride by the suspension process in the presence of an emulsion of a polyacrylic ester that has been manufactured by emulsion polymerization.

It is likewise in the prior art (German Green Pat. 1,205,282) to polymerize vinyl chloride in suspension and lower the reaction temperature during the polymerization.

It is an object of the present invention to provide a process for manufacturing polymers on the basis of polyvinyl chloride by suspension polymerization in the presence of a polyacrylic ester emulsion avoiding the disadvantages of the art and resulting in a sheet material of the desired transparency.

Another object of the invention is to provide a process for manufacturing polymers on the basis of polyvinyl chloride by suspension polymerization in the presence of a polyacrylic ester emulsion, which polymers can be easily calendered into glass-clear, transparent sheets having excellent deep drawing properties.

A further object of the invention is the provision of polymers on the basis of polyvinyl chloride which can be worked to form glass-clear, transparent sheets having excellent deep drawing properties.

Still further objects will become apparent from the following description.

These objects are attained in accorrance with the present invention by subjecting vinyl chloride or vinyl chloride and a suitable monomer copolymerizable therewith to suspension polymerization in the presence of an emulsion of a polyacrylic ester or of an acrylic ester copolymer composed of two or more different acrylic ester units, or of a polyacrylic ester mixture having a solid content of 0.1 to 2 weight percent, and preferably 0.3 to 1.2 weight percent, referred to the monomer or to the monomer mixture, the polymerization being carried out in the presence of any of the conventional monomer-soluble catalysts at a temperature of 50 to 80° C., and during the polymerization the temperature is gradually increased or decreased until a pressure drop occurs, and/or the temperature is raised or lowered by 2 to 30° C. after a conversion of 20 to 80%, preferably 40 to 60% of the monomer material has occurred.

The polyacrylic ester is preferably employed in an amount of 0.1 to 20% by weight and most preferably in an amount of 0.3 to 10% by weight referred to the polyvinyl chloride polymer. As monomers or copolymerizates with the polyvinyl chloride there can be employed any of the following: vinylpropionate, vinylstearate, vinylidenechloride, maleic ester, fumaric ester, dichloroethylene, trichloroethylene, ethylene, propylene, etc. Preferably the comonomer is found in an amount of 0.1 to 25% and most preferably 0.5–15%.

The polyacrylic esters as used herein contain radicals of aliphatic linear or branched alcohols having 2 to 10 carbon atoms and are exemplified by polyethylacrylate, polyisooctylacrylate, polybutylacrylate, polynonylacrylate, polypropylacrylate and copolymers thereof.

The polyacrylic esters used according to the invention are manufactured by the emulsion polymerization process.

For the manufacture of the acrylic ester copolymers, acrylic esters are employed which contain radicals of aliphatic linear or branched alcohols having 2 to 10 carbon atoms.

The polyvinyl chloride polymers manufactured according to the invention are mixed with lubricants and stabilizers in mixing machines. It has surprisingly been found that the material, which has been preplastified on roller mixers, can be calendered into a glass-clear, transparent sheet which has excellent deep drawing qualities. If the substances added are physiologically unobjectionable, the sheet is excellently suitable for use as a wrapping material for foodstuffs.

The polyvinyl chloride polymers are processed by incorporating 0.2 to 3% of a stabilizer or a mixture of stabilizers and 0.2 to 2% of a lubricant or mixture of lubricants. The resultant mixture is then subjected to working on a calender to form sheets, etc. As stabilizers there can preferably be employed 17 M dibutyl tin mercaptide, the same can be employed alone or in admixture with T 36, a sulfur compound or a barium-cadmium stabilizer. The stabilizer in this instance is used in an amount of 0.2 to 1.5%. If the end product is intended for use as a food packaging material, 17 MO dioctyl tin mercaptide is preferred as stabilizer and acetyl tributylcitrate and/or dibutylsebacate is preferred as lubricant. Instances of other lubricants which are suitable for use herein include fatty alcohols having a carbon chain of from 12 to 22 and preferably 14 to 18 carbon atoms, montan waxes such as for example E-waxes, the latter constituting long chain aliphatic esters of $C_{22}$–$C_{35}$ acids esterified with glycol.

As polymerization catalysts there can be employed for example, lauroyl peroxide, benzoyl peroxide, acetyl-cyclohexone-sulfonyl peroxide, diisopropyl peroxide carbonate and like known vinyl chloride polymerization catalysts.

The polymerization can be carried out in the presence of customary amounts of protective colloids, such as methyl cellulose, fatty alcohol sulfonates and alkaline earth salts, preferably those of calcium and magnesium. Vinyl acetate is an especially good comonomer to use in a vinyl chloride copolymer.

The tensile strength of sheets having a thickness of 0.1 to 0.25 mm. amounts to between 550 and 640 kp./cm.$^2$ for the sheets produced in accordance with the invention. The tear strengths were measured by the procedure set out in DIN 53371 and amounted to between 440 and 640 kp./cm.$^2$. The tear elongation for the same sheets amounted to between 4 and 10% and the deformation resistance (Vicat) was between 70 and 90° C. The values are to some extent dependent on the amount of additives and the specific polymers employed.

The invention will be more fully understood from the following examples which are given by way of illustration without any intention that the invention be limited thereto.

EXAMPLE 1

750 kg. of vinyl chloride, 1900 kg. of water, 1.69 kg. of methyl cellulose, 0.6 kg. of sodium dodecyl sulfonate, 0.825 kg. of calcium chloride, 1.12 kg. of lauroyl peroxide and 7.5 kg. of polybutyl acrylate in the form of a 30% emulsion thereof were introduced into an autoclave having a capacity of 3000 liters and equipped with a controllable agitator and with means for heating and cooling. The contents of the autoclave were heated with agitation to 52° C., held at this temperature for about half an hour, and then raised to 68° C. in the course of 7 hours. When this temperature had been reached or shortly thereafter, a pressure drop was observed to have occurred. The polymer was then separated and processed in the usual manner.

The polymers produced in accordance with Example 1, when formed into sheets, exhibited tensile strengths of between 575 and 610 kp./cm.$^2$, tear strengths of 460 to 620 kp./cm.$^2$ and Vicat values of 75 to 79° C.

EXAMPLE 2

The procedure followed was the same as that set out in Example 1, with the exception that the autoclave was heated to 66° C. The temperature was maintained for about 3 hours, and then it was lowered to 56° C., and the polymerization carried out at this temperature until the pressure in the autoclave dropped. The polymer was then separated and processed in the usual manner.

EXAMPLE 3

50 kg. of vinyl chloride, 120 kg. of desalted water, 112.5 g. of methyl cellulose, 40 g. of sodium dodecyl sulfonate, 75 g. of lauroyl peroxide and 500 g. of polyisooctyl acrylate in the form of a 30% emulsion thereof were introduced into an autoclave having a capacity of 200 liters. The heating and cooling and the separation of the polymer were carried out as set out in Examples 1 and 2.

EXAMPLE 4

The procedure followed was analogous to that described in Example 3, but in place of polyisooctyl acrylate, a mixture of 360 g. of polybutyl acrylate and 140 g. of polyethyl acrylate were used.

EXAMPLE 5

The procedure which was followed was that described in Example 3, but instead of the polyisooctyl acrylate, an acrylic ester copolymer prepared by the polymerization of a mixture of 360 g. of butyl acrylate and 140 g. of ethyl acrylate was employed.

EXAMPLE 6

10 kg. of acrylic acid butyl ester, 23 kg. of water, 150 g. of sodium dodecyl sulfonate and 70 g. of potassium persulfate were placed in a forty-liter autoclave and therein polymerized for 3 hours at 50° C. Thereafter the temperature was raised to 80° C., and polymerization continued for 1½ hours at this temperature.

What is claimed is:

1. In the process of producing vinyl chloride polymer suitable for the production of sheet material therefrom, by suspension polymerizing monomer comprising vinyl chloride in contact with a water-soluble or monomer-soluble polymerization catalyst, the improvement whereby increasing the transparency of sheet material formed from said polymer on a calender by maintaining high calender roll temperatures while at the same time minimizing sticking of said polymer to the calender rolls without increasing the proportion of anti-sticking agents added to said polymer, which comprises:

(A) carrying out said suspension polymerization in the presence of an emulsion of an emulsion polymer of at least one acrylic ester having a solids content of 0.1 to 2 weight percent referred to said monomer at about 50 to 80° C.; and (B) after about 20 to 80% of said monomer has polymerized, adjusting the polymerization temperature for the remainder of the polymerization about 2 to 30° C. in a direction and to extent sufficient to cause a pressure drop in said polymerization.

2. The improved process claimed in claim 1, wherein said step B is effected after about 40 to 60% of said monomer has been converted to polymer.

3. The improved process claimed in claim 1, wherein said emulsion has a solids content of 0.3 to 1.2% and is a member selected from the group consisting of a polyacrylate, a mixture of polyacrylates having different alcoholic moieties, and a copolymer of acrylates having different alcoholic moieties wherein the alcoholic moieties of said acrylates are from alkanols having 2 to 10 carbon atoms.

4. The improved process claimed in claim 1, wherein said catalyst is lauroyl peroxide.

5. The improved process claimed in claim 1, wherein said monomers are vinyl chloride and vinyl acetate and said polymer is a copolymer.

6. The improved process claimed in claim 1, wherein said polymerization is carried out in the presence of a protective colloid.

7. The improved process claimed in claim 1, wherein said emulsion is a 30% emulsion of a polymer selected from the group consisting of polybutyl acrylate, polyisononyl acrylate, a mixture of polybutyl acrylate and polyethyl acrylate, and a copolymer of butyl acrylate and ethyl acrylate.

References Cited

UNITED STATES PATENTS

| | | | |
|---|---|---|---|
| 2,686,172 | 8/1954 | Wolf | 260—884 |
| 3,019,208 | 1/1962 | Reid et al. | 260—29.6(RU) |
| 3,206,424 | 9/1965 | Heinrich et al. | 260—29.6(RU) |
| 3,290,265 | 12/1966 | Kaneko et al. | 260—29.6(RU) |

FOREIGN PATENTS

| | | | |
|---|---|---|---|
| 889,645 | 2/1962 | Great Britain | 260—29.6(RU) |

SAMUEL H. BLECH, Primary Examiner

R. J. SEIBERT, Assistant Examiner

U.S. Cl. X.R.

260—28.5, 29.6, 33.4, 45.75, 885